(12) United States Patent
Yamashita et al.

(10) Patent No.: US 10,696,022 B2
(45) Date of Patent: Jun. 30, 2020

(54) COMPOSITE PLATE AND PRODUCTION METHOD THEREFOR

(71) Applicant: TOSOH CORPORATION, Shunan-shi, Yamaguchi (JP)

(72) Inventors: Isao Yamashita, Ayase (JP); Kohei Imai, Ayase (JP); Shoichi Yamauchi, Ayase (JP); Koji Tsukuma, Ayase (JP)

(73) Assignee: TOSOH CORPORATION, Shunan (JP)

( * ) Notice: Subject to any disclaimer, the term of this patent is extended or adjusted under 35 U.S.C. 154(b) by 1001 days.

(21) Appl. No.: 14/408,989

(22) PCT Filed: Jun. 26, 2013

(86) PCT No.: PCT/JP2013/004006
§ 371 (c)(1),
(2) Date: Dec. 18, 2014

(87) PCT Pub. No.: WO2014/002498
PCT Pub. Date: Jan. 3, 2014

(65) Prior Publication Data
US 2015/0174863 A1     Jun. 25, 2015

(30) Foreign Application Priority Data

Jun. 27, 2012    (JP) .................. 2012-144677

(51) Int. Cl.
*B32B 18/00*    (2006.01)
*B32B 7/12*    (2006.01)
(Continued)

(52) U.S. Cl.
CPC ............... *B32B 18/00* (2013.01); *B32B 5/16* (2013.01); *B32B 7/12* (2013.01); *B32B 15/16* (2013.01);
(Continued)

(58) Field of Classification Search
CPC ......... B32B 18/00; B32B 15/20; B32B 15/16; B32B 5/16; B32B 37/18; B32B 17/06;
(Continued)

(56) References Cited

U.S. PATENT DOCUMENTS 4,742,030 A * 5/1988 Masaki ................ C04B 35/486
423/608
4,763,828 A    8/1988 Fukaya et al.
(Continued)

FOREIGN PATENT DOCUMENTS

CN    101844920 A    9/2010
CN    101988327 A    3/2011
(Continued)

OTHER PUBLICATIONS

Karaulov (Karaulov, et al., "Sintering zirconia with ytrrium oxide," Ukrainian Scientific-Research Institute for Refractories, No. 2, p. 54-58, Feb. 1975).*
(Continued)

*Primary Examiner* — Gerard Higgins
*Assistant Examiner* — Kevin C Ortman, Jr.
(74) *Attorney, Agent, or Firm* — Nixon & Vanderhye P.C.

(57) ABSTRACT

A composite plate having a thickness of no more than 2 mm, and having laminated therein a zirconia sintered body, an adhesive layer, and a base material, the elasticity of the base material being no more than 100 GPa, and the apparent density of the composite plate being no more than 4.3 g/cm$^3$.

12 Claims, 1 Drawing Sheet

(51) Int. Cl.
| | |
|---|---|
| B32B 17/06 | (2006.01) |
| H05K 5/02 | (2006.01) |
| C04B 35/488 | (2006.01) |
| C04B 37/04 | (2006.01) |
| C04B 37/00 | (2006.01) |
| C04B 35/486 | (2006.01) |
| C04B 35/634 | (2006.01) |
| C04B 35/645 | (2006.01) |
| C04B 37/02 | (2006.01) |
| G04B 37/22 | (2006.01) |
| B32B 5/16 | (2006.01) |
| B32B 15/20 | (2006.01) |
| B32B 15/16 | (2006.01) |
| B32B 37/12 | (2006.01) |
| B32B 37/18 | (2006.01) |
| H04M 1/02 | (2006.01) |

(52) U.S. Cl.
CPC ............ *B32B 15/20* (2013.01); *B32B 17/06* (2013.01); *B32B 37/12* (2013.01); *B32B 37/18* (2013.01); *C04B 35/486* (2013.01); *C04B 35/4885* (2013.01); *C04B 35/63452* (2013.01); *C04B 35/645* (2013.01); *C04B 37/008* (2013.01); *C04B 37/028* (2013.01); *C04B 37/047* (2013.01); *G04B 37/22* (2013.01); *H05K 5/02* (2013.01); *B32B 2264/102* (2013.01); *B32B 2307/306* (2013.01); *B32B 2307/4026* (2013.01); *B32B 2307/54* (2013.01); *B32B 2307/554* (2013.01); *B32B 2307/558* (2013.01); *B32B 2307/72* (2013.01); *B32B 2439/00* (2013.01); *B32B 2457/00* (2013.01); *C04B 2235/3217* (2013.01); *C04B 2235/3222* (2013.01); *C04B 2235/3224* (2013.01); *C04B 2235/3225* (2013.01); *C04B 2235/3248* (2013.01); *C04B 2235/3262* (2013.01); *C04B 2235/3272* (2013.01); *C04B 2235/3275* (2013.01); *C04B 2235/3279* (2013.01); *C04B 2235/3418* (2013.01); *C04B 2235/6562* (2013.01); *C04B 2235/77* (2013.01); *C04B 2235/96* (2013.01); *C04B 2235/9661* (2013.01); *C04B 2237/348* (2013.01); *C04B 2237/40* (2013.01); *C04B 2237/401* (2013.01); *C04B 2237/70* (2013.01); *C04B 2237/704* (2013.01); *C04B 2237/706* (2013.01); *C04B 2237/708* (2013.01); *H04M 1/0202* (2013.01); *Y10T 428/1317* (2015.01); *Y10T 428/24967* (2015.01)

(58) Field of Classification Search
CPC .. B32B 7/12; H05K 5/02; G04B 37/22; C04B 35/63452; C04B 37/047; C04B 35/4885; C04B 37/028; C04B 37/008
USPC ....... 428/220, 141, 213, 216, 446, 447, 336, 428/116, 212, 402, 426, 448, 457, 215, 428/339, 34.1, 41.3, 41.8, 483, 137, 142, 428/143, 161, 172, 221, 313.9, 327, 328, 428/337, 34.7, 35.4, 367, 40.1, 412, 422, 428/473.5, 480, 500, 697, 113, 114, 134, 428/138, 157, 174, 189, 1.31, 1.51, 209, 428/210, 217, 218, 300.7, 301.1, 304.4, 428/307.7, 312.8, 315.9, 317.3, 319.1, 428/323, 325, 329, 330, 331, 335, 347, 428/34.4, 34.6, 354, 355 AC, 368, 36.4, 428/36.6, 36.91, 398, 400, 403, 408, 410, 428/413, 421, 422.8, 423.1, 425.9, 428, 428/450, 451, 452, 454, 458, 462

See application file for complete search history.

(56) References Cited

U.S. PATENT DOCUMENTS

| | | | |
|---|---|---|---|
| 2006/0268528 | A1* | 11/2006 | Zadesky ............... H04M 1/026 361/728 |
| 2011/0183091 | A1* | 7/2011 | Zhu ........................ C23C 4/02 428/34.6 |
| 2011/0201490 | A1* | 8/2011 | Barefoot ............ C03B 33/0222 501/66 |
| 2012/0069517 | A1* | 3/2012 | Prest ..................... G06F 1/1656 361/679.56 |
| 2012/0301668 | A1* | 11/2012 | Numano ................. B32B 15/08 428/138 |

FOREIGN PATENT DOCUMENTS

| | | | |
|---|---|---|---|
| JP | 60-131875 | 7/1985 | |
| JP | 01-271234 | 10/1989 | |
| JP | 06-242260 | 9/1994 | |
| JP | 2005-298915 | 10/2005 | |
| JP | 2007-275144 | 10/2007 | |
| JP | 2008-162164 | 7/2008 | |
| JP | 2009-203097 | 9/2009 | |
| JP | 2009-264692 | 11/2009 | |
| WO | WO 2009/017080 | 2/2009 | |
| WO | WO 2011086860 A1 * | 7/2011 | ............ B32B 15/08 |

OTHER PUBLICATIONS

Azom ("Aluminum—Specifications, Properties, Classifications and Classes, Supplier Data by Aalco," p. 1-13, May 17, 2005).*
Tosoh ("Zirconia", Tosoh, http://www.eskens.com/wp-content/uploads/2014/05/ZIRCONIA-BROCHURE.pdf, p. 1-12, accessed Jun. 17, 2017).*
International Preliminary Report on Patentability issued in PCT/JP2013/004006 (dated Jan. 8, 2015).
International Search Report for PCT/JP2013/004006, dated Sep. 17, 2013, two pages.

* cited by examiner

COMPOSITE PLATE AND PRODUCTION METHOD THEREFOR

This application is the U.S. national phase of International Application No. PCT/JP2013/004006 filed Jun. 26, 2013 which designated the U.S. and claims priority to JP 2012-144677 filed Jun. 27, 2012, the entire contents of each of which are hereby incorporated by reference.

TECHNICAL FIELD

The present invention relates to a composite plate including a zirconia sintered body having abrasion resistance and shock resistance and a base material having a specific elastic modulus or to a composite plate including the zirconia sintered body and a base material formed from at least one selected from the group consisting of tempered glass, Bakelite, aluminum, and magnesium. The present invention also relates to methods of producing these composite plates.

BACKGROUND ART

In recent years, demand for components having high abrasion resistance and shock resistance is increasing in mobile electronic devices typified by smartphones. Particularly, since exterior components of mobile electronic devices have a thin plate shape with a thickness of about 1 to about 2 mm and must withstand impact such as falling impact, a particularly high-shock resistant material is required for these exterior components.

A currently used material is tempered glass strengthened by ion exchange. A tempered layer of several tens of micrometers is formed on the surface of the glass by ion exchange to generate compressive stress on the surface, whereby propagation of cracks is prevented. However, since the strengthening mechanism of the tempered glass is due to the tempered layer, the tempered glass is broken immediately when a crack propagates across the tempered layer. The Vickers hardness of the glass is about 600. Therefore, a problem with the glass is that it is easily flawed by contact with metal, concrete, etc. and the strength is reduced significantly by flaws formed during use.

Ceramics are excellent in heat resistance, wear resistance, and corrosion resistance and are therefore widely used for industrial component applications. Particularly, zirconia sintered bodies have high strength, high toughness, high hardness, and abrasion resistance, and their design can be easily improved by coloration. Therefore, the zirconia sintered bodies are being increasingly used for watch components etc. The use of zirconia sintered bodies for exterior components of mobile electronic devices etc. is also contemplated. Particularly, when a zirconia sintered body is used for an exterior component of a mobile electronic device, the thickness of the zirconia sintered body must be increased in order to improve shock resistance. Therefore, the weight of the component becomes high, which is not practically advantageous. When the thickness is reduced to reduce the weight, resistance to impact of falling, collision, etc. becomes insufficient, and the zirconia sintered body is easily cracked and becomes unusable.

To improve the shock resistance of a ceramic component, a method similar to laminated glass has been proposed (for example, Patent Literatures 1 and 2). Specifically, the ceramic component is joined to a fiber-reinforced plastic to prevent a flying object such as a cannonball from piercing the ceramic component. Unfortunately, this method is for the purpose of preventing the penetration of the flying object, and cracking of the ceramic due to collision cannot be prevented.

Patent Literature 3 describes a watch cover glass produced by joining sapphire and inorganic glass. However, the purpose of this cover glass is to improve its abrasion resistance by disposing high-hardness sapphire on the surface of the watch cover glass, and high shock resistance required for the mobile electronic device applications cannot be obtained using this method.

Therefore, there has been no shock resistant component that is used for a zirconia sintered body plate having a thickness of several millimeters and has improved resistance to cracking due to impact of falling, collision, etc., and there has been no method of producing such a shock resistant component.

CITATION LIST

Patent Literature

Patent Literature 1: Japanese Patent No. 4869915 (Japanese Patent Application Laid-Open No. 2008-162164)
Patent Literature 2: Japanese Patent Application Laid-Open No. 2009-264692
Patent Literature 3: Japanese Patent Application Laid-Open No. Hei. 6-242260

SUMMARY OF INVENTION

Technical Problem

To improve the shock resistance of a zirconia sintered body, its thickness must be increased, and such a thick component is not suitable for mobile electronic devices. The present invention relates to a composite plate including a zirconia sintered body with improved shock resistance, particularly improved resistance to cracking due to impact, and a base material having a specific elastic modulus or to a composite plate including the zirconia sintered body and a base material formed from at least one selected from the group consisting of tempered glass, Bakelite, aluminum, and magnesium. The present invention also relates to methods of producing these composite plates.

Solution to Problem

In view of the above problems, the present inventors have conducted detailed studies on a fracture phenomenon of a zirconia sintered body thin plate when a steel ball is dropped thereonto. The present inventors have found that the ceramic plate is bent by the impact of the dropped steel ball and a bending moment is thereby generated to cause tensile fracture to occur from the vicinity of the impact point on a side opposite to the impact side. The present inventors have also found that a material having a smaller elastic modulus is more likely to be deformed largely by the impact and absorbs the impact over a long time, so that the absolute value of the maximum tensile stress acting on the side opposite to the impact side is reduced.

The present inventors have conducted extensive studies based on the above findings and found that the shock resistance of a zirconia sintered body thin plate can be improved by realizing the following structure, and thus the present invention has been completed. Specifically, a base material formed from at least one material selected from the group consisting of tempered glass, Bakelite, aluminum, and magnesium is disposed on the rear side of the zirconia sintered body thin plate (elastic modulus: 200 GPa). The elastic modulus of the at least one material is equal to or less than one half that of the zirconia sintered body thin plate (the elastic modulus of the at least one material is about 70 GPa). The base material and the zirconia sintered body thin plate are firmly bonded to each other, and the ability to deform upon impact is thereby imparted to the zirconia sintered body thin plate to reduce the maximum tensile stress. In this structure, the base material is disposed on the rear side on which tensile stress is generated, and the zirconia sintered body thin plate is disposed on the impact side on which compressive stress is mainly generated.

Accordingly, the present invention relates to a composite plate (composite plate 1) comprising a laminate including a zirconia sintered body, an adhesive layer, and a base material having an elastic modulus of 100 GPa or less, and the composite plate has a thickness of 2 mm or less and an apparent density of 4.3 g/cm$^3$ or less. The present invention also relates to a composite plate (composite plate 2) comprising a laminate including, in the following order, a zirconia sintered body, a bonding layer, and a base material formed from at least one selected from the group consisting of tempered glass, Bakelite, aluminum, and magnesium, wherein the ratio of the thickness of the zirconia sintered body to the thickness of the base material (the thickness of the zirconia sintered body/the thickness of the base material) is 0.1 to 1, and the composite plate has a thickness of 2 mm or less and the apparent density of the composite plate is 4.3 g/cm$^3$ or less. The present invention also relates to methods of producing these composite plates.

The present invention will next be described in detail.

The composite plate 1 of the present invention is a composite plate comprising a laminate including a zirconia sintered body, an adhesive layer, and a base material having an elastic modulus of 100 GPa or less, and the composite plate has a thickness of 2 mm or less and an apparent density of 4.3 g/cm$^3$ or less.

Examples of the base material include tempered glass, Bakelite, aluminum, and magnesium. The elastic modulus of the base material is 100 GPa or less, preferably 3 to 100 GPa, and particularly preferably 5 to 70 GPa. This is because the deformability of the base material can be improved to reduce the maximum tensile stress and the base material can be disposed on the rear side on which tensile stress is generated.

The composite plate 2 of the present invention is a composite plate comprising a laminate including, in the following order, a zirconia sintered body, an adhesive layer, and a base material formed from at least one selected from the group consisting of tempered glass, Bakelite, aluminum, and magnesium, the composite plate having a thickness of 2 mm or less. In the composite plate of the present invention, the ratio of the thickness of the zirconia sintered body to the thickness of the base material (the thickness of the zirconia sintered body/the thickness of the base material) is 0.1 to 1. When the ratio of the thickness of the zirconia sintered body to the thickness of the base material is 0.1 to 1, the composite plate can be a shock resistant composite plate having high abrasion resistance and light-weight. The ratio is preferably 0.1 to 0.75 and more preferably 0.1 to 0.5. This is because a reduction in shock resistant strength can be suppressed while an increase in the apparent density of the composite plate due to an increase in the thickness of the zirconia sintered body sintered body is suppressed and because a reduction in abrasion resistance due to a reduction in the thickness of the zirconia sintered body can be suppressed.

In the composite plates 1 and 2 of the present invention, the apparent density (ρ (composite plate)) is given by formula (1) using the theoretical density of the zirconia sintered body (ρ (zirconia sintered body)) and the theoretical density of a base material or the theoretical density of a base material formed from at least one selected from the group consisting of tempered glass, Bakelite, aluminum, and magnesium (ρ (base material)).

$$\rho(\text{composite plate}) = \rho(\text{zirconia sintered body}) \times \text{volume ratio of zirconia sintered body} + \rho(\text{base material}) \times \text{volume ratio of base material} = \rho(\text{zirconia sintered body}) \times \text{thickness ratio of zirconia sintered body} + \rho(\text{base material}) \times \text{thickness ratio of base material} \quad (1)$$

Here, the density of aluminosilicate-based tempered glass, 2.45 g/cm$^3$, is used as the density of the tempered glass. Since the density (ρ(base material)) when Bakelite, aluminum, or magnesium is used varies depending on components constituting each of the base materials, the density of each of the base materials must be measured.

In the composite plates 1 and 2 of the present invention, when the apparent density is 4.3 g/cm$^3$ or less, light weight feeling sufficient for use as an exterior component can be obtained.

The base material in the composite plate 1 of the present invention or the base material in the composite plate 2 that is formed from at least one selected from the group consisting of tempered glass, Bakelite, aluminum, and magnesium is bonded through the adhesive layer. The thickness of the adhesive layer is preferably 200 μm or less. The thickness of the adhesive layer is preferably 100 μm or less and more preferably 50 μm or less. When the thickness of the adhesive layer is set as described above, the zirconia sintered body and the base material are deformed together and absorb impact, so that the shock resistance can be improved.

In the composite plates 1 and 2 of the present invention, the zirconia sintered body is preferably yttria-stabilized zirconia having high strength, wear resistance, and high toughness. Preferably, the zirconia sintered body is zirconia containing 2-10 mol % of yttria. More preferably, the amount of yttria is 2-4 mol %. When the compositional ratio of yttria with respect to zirconia is 2-10 mol %, high strength, wear resistance, and high toughness can be obtained. A stabilizer other than yttria can be used for the zirconia sintered body. Examples of the other stabilizers include calcia, magnesia, and ceria.

In the composite plates 1 and 2 of the present invention, the zirconia sintered body may further contain, for example, a coloring agent to improve its design. Preferably, the coloring agent contained is, for example, a white pigment such as alumina or a coloring pigment such as a transition metal oxide. The white pigment used may be an oxide such as alumina, silica, mullite, or spinel. For colors other than white, any general inorganic pigment can be used. For example, spinel-based composite oxides containing transition metals such as Fe, Co, Ni, and Mn and oxides of rare-earth metals such as erbium, neodymium, and praseodymium can be used. For example, zircon including a transition metal added thereto may also be used. An oxide of a transition metal such as nickel or iron can also be used as a pigment.

In the composite plates 1 and 2 of the present invention, the zirconia sintered body has a relative density of preferably 97% or higher. The relative density is more preferably 98% or higher and still more preferably 99% or higher, in order to further improve the abrasion resistance and to suppress a reduction in design due to irregularities on the surface of the sintered body caused by residual pores when the surface is mirror-polished.

In the composite plates 1 and 2 of the present invention, the zirconia sintered body has a Vickers hardness of preferably 1,000 or more and more preferably 1,100 or more, in order to obtain sufficient abrasion resistance.

The tempered glass in the exemplifications in the composite plate 1 of the present invention and the tempered glass used in the composite plate 2 are preferably chemically strengthened aluminosilicate glass. Other examples of the tempered glass include thermally tempered glass. However, the impact strength of the thermally tempered glass after strengthening is low, and it is difficult to form the thermally tempered glass into a thin-plate shape. Therefore, the chemically strengthened glass is preferred. The chemically strengthened glass used can be general silica-based soda lime glass, borosilicate glass, etc. It is preferable to use aluminosilicate glass having high shock resistance.

The Bakelite in the exemplifications in the composite plate 1 of the present invention and the Bakelite used in the composite plate 2 are, generally, a thermosetting resin formed from phenol and formaldehyde as raw materials and are referred to also as phenolic resin. Specifically, cloth Bakelite prepared by applying a phenolic resin used as a raw material to cloth and then thermo-setting the phenolic resin, paper Bakelite prepared by applying a phenolic resin used as a raw material to paper and then thermo-setting the phenolic resin, etc. are preferred.

The aluminum in the exemplifications in the composite plate 1 of the present invention and the aluminum used in the composite plate 2 are preferably aluminum or an aluminum alloy. The aluminum alloy is a binary or higher alloy containing aluminum as the component contained in the largest amount, and examples of the component of the alloy include Si, Fe, Cu, Mn, Mg, Cr, Zn, and Ti.

The magnesium in the exemplifications in the composite plate 1 of the present invention and the magnesium used in the composite plate 2 are preferably magnesium or a magnesium alloy. The magnesium alloy is a binary or higher alloy containing magnesium as the component contained in the largest amount, and examples of the component of the alloy include Al, Zn, Zr, Mn, Fe, Si, Cu, Ni, and Ca.

In the composite plates 1 and 2 of the present invention, the shock resistance (crack resistance) is high. Specifically, when each of the composite plates 1 and 2 is subjected to an impact test in which the composite plate is bonded to an aluminum alloy using a 0.1 mm-thick double-sided tape and a steel ball of 130 g is freely falled from a any height, the shock resistance value, i.e., the height that causes a crack to occur in the zirconia sintered body (fracture height), is 10 cm or more, preferably 15 cm or more, and more preferably 20 cm or more. When the fracture height is 10 cm or more, shock resistance to impact of falling, collision, etc. can be imparted to the composite plate when it is used for the casings of mobile electronic devices.

In the present invention, a laminate of two or more types of base materials may be used in the composite plate 1, and a laminate of two or more types of base materials selected from the group consisting of tempered glass, Bakelite, aluminum, and magnesium may be used in the composite plate 2.

A production method of the composite plate 1 of the present invention will next be described in detail.

The composite plate 1 of the present invention can be produced, for example, by bonding the zirconia sintered body and the base material using an epoxy-based thermosetting adhesive at a temperature of 300° C. or lower. The adhesive used for bonding is preferably an epoxy-based thermosetting adhesive. This is because the epoxy-based thermosetting adhesive may not cause a reduction in the strength of the base material due to relaxation of compressive stress acting on the tempered layer of the base material during heating for bonding, and because high bonding strength is obtained between the zirconia sintered body and the base material and the epoxy-based thermosetting adhesive has high heat resistance and high shock resistance. A filler such as inorganic particles may be added to the adhesive to improve the stiffness of the adhesive layer.

In the production method of a thin plate of the zirconia sintered body in the composite plate 1 of the present invention, the thin plate can be produced using a general ceramic molding process. Examples of the molding process include a pressing method, an extrusion method, a slip casting method, an injection molding method, and a sheet molding method. Of these, a sheet molding method using a doctor blade is preferred. Specifically, a slurry prepared by mixing zirconia powder and an organic binder is used to form a green sheet having a thickness of 0.1 to 1 mm using a doctor blade, and the green sheet is sintered at 1,300 to 1,500° C. to obtain a zirconia sintered body. Then the zirconia sintered body is bonded to the base material, and the surface of the zirconia sintered body is ground and polished, whereby the composite plate can be produced. The sintering is performed generally in air, but vacuum sintering, hot-pressing, a hot isostatic pressing (HIP) method, etc. may also be used.

Next, a production method of the composite plate 2 of the present invention will be described in detail.

The composite plate 2 of the present invention can be produced, for example, by bonding the zirconia sintered body and the base material formed from at least one selected from the group consisting of tempered glass, Bakelite, aluminum, and magnesium, using an epoxy-based thermosetting adhesive at a temperature of 300° C. or lower. The adhesive used for bonding is preferably an epoxy-based thermosetting adhesive. This is because the epoxy-based thermosetting adhesive may not cause a reduction in glass strength due to relaxation of compressive stress acting on the tempered layer of the base material formed from at least one selected from the group consisting of tempered glass, Bakelite, aluminum, and magnesium during heating for bonding, and because high bonding strength is obtained between the zirconia sintered body and the base material formed from at least one selected from the group consisting of tempered glass, Bakelite, aluminum, and magnesium and the epoxy-based thermosetting adhesive has high heat resistance and high shock resistance. A filler such as inorganic particles may be added to the adhesive to improve the stiffness of the adhesive layer.

In the production method of a thin plate of the zirconia sintered body in the composite plate 2 of the present invention, the thin plate can be produced using a general ceramic molding process. Examples of the molding process include a pressing method, an extrusion method, a slip casting method, an injection molding method, and a sheet molding method. Of these, a sheet molding method using a doctor blade is preferred. Specifically, a slurry prepared by mixing zirconia powder and an organic binder is used to form a green sheet having a thickness of 0.1 to 1 mm using a doctor blade, and the green sheet is sintered at 1,300 to 1,500° C. to obtain a zirconia sintered body. Then the zirconia sintered body is bonded to the base material formed from at least one selected from the group consisting of tempered glass, Bakelite, aluminum, and magnesium, and the surface of the zirconia sintered body is ground and polished, whereby the composite plate can be produced. The sintering is performed generally in air, but vacuum sintering, hot-pressing, a hot isostatic pressing (HIP) method, etc. may also be used.

Advantageous Effects of Invention

Each of the composite plates 1 and 2 of the present invention has a thin-plate shape, has high shock resistance and high abrasion resistance, and can therefore be used as casing components for mobile electronic devices such as smartphones, tablet devices, notebook PCs, and portable music players. The composite plates 1 and 2 can also be used as components of input devices such as touch pads. When tempered glass or Bakelite is used as the base material of the composite plate 2, the composite plate 2 has dielectric characteristics comparable to those of tempered glass and therefore can also be used for components required to have radio wave permeability such as protective members of antennas. When a colored zirconia sintered body is used, the design of the composite plate can be easily improved, and therefore the composite plate can also be used as a watch component.

EXAMPLES

Figure 1:
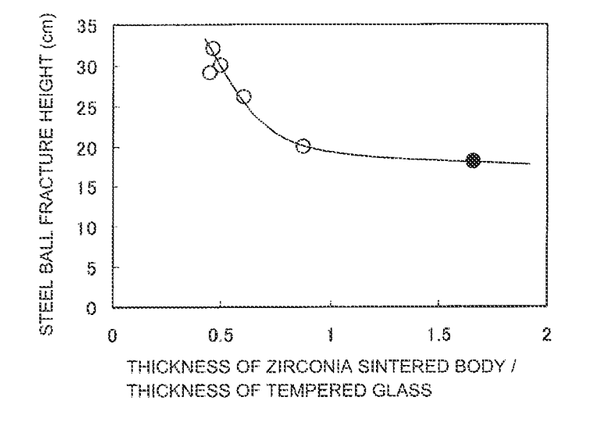
FIG. 1 is a diagram showing the correlation between steel ball fracture height and the ratio of the thickness of a zirconia sintered body and the thickness of tempered glass in composite plates using white zirconia (product name "3YS20A," manufactured by TOSOH Corporation). ◯ (Open circle): Examples 1 to 4 and 14 (composite plate thickness: about 1 mm). ● (Solid circle): Comparative Example 1 (composite plate thickness: 1.49 mm).

The present invention will be specifically described by way of Examples and Comparative Examples.
(Relative Density)
The density of a sample was measured using the Archimedes method. The obtained density was used to determine the relative density with respect to the theoretical density. The theoretical densities of sintered bodies obtained by sintering of powers used in the following Examples and Comparative Examples are as follows. A sintered body using a white zirconia powder (3YS20A): 5.51 g/cm$^3$. A sintered body using a black zirconia powder (product name "TZ-Black," manufactured by TOSOH Corporation): 6.06 g/cm$^3$. A sintered body using a zirconia powder (product name "3YSE," manufactured by TOSOH Corporation): 6.09 g/cm$^3$. Powders prepared by adding high-purity alumina in amounts of 40 wt % and 60 wt % to a zirconia powder (product name "3YS," manufactured by TOSOH Corporation) are denoted by 3YS40A and 3YS60A. The theoretical densities of their sintered bodies are 3YS40A: 5.03 g/cm$^3$ and 3YS60A: 4.63 g/cm$^3$.
(Measurement of Impact Strength)
The impact strength of a composite plate was evaluated using a steel ball drop test. A method similar to ISO14368-3 in the specifications of "Dimensions of watch glass and test method" was used for the steel ball drop test. Specifically, one of the composite plates obtained in the Examples and Comparative Examples was secured to a 5 mm-thick flat aluminum alloy (50 mm×52 mm) using a 0.1 mm-thick double-sided tape (product number "4511-100," manufactured by 3M). Then a steel ball of 130 g was freely falled onto the central position of the composite plate from a any height, and the fracture height was determined in steps of 1 cm. The impact surface used was a mirror polished surface with a surface roughness Ra of 0.02 μm or less.
(Measurement of Dielectric Constant)
The measurement of dielectric constant was performed by a capacitance method using an impedance analyzer. A surface bonded to an electrode was mirror polished, and the dielectric constant and dielectric loss tangent were measured at room temperature and a frequency of 1 GHz.
(Biaxial Bending Measurement)
The bending strength of a composite plate was measured according to biaxial bending strength measurement (ISO/DIS6872). The measurement was performed as follows. The radius of a support was set to 6 mm, and the center of the composite plate was placed on the support with the zirconia sintered body thin plate on the front side and the base material surface on the rear side. An indenter was placed such that a load was applied to the center of the zirconia sintered body thin plate. To compute the bending strength, a reduced diameter using a flat plate area was used. The zirconia sintered body used had opposite surfaces mirror-polished to a surface roughness Ra of 0.02 μm or less.

Examples 1-13

Production of Zirconia Sintered Bodies

Each of a white zirconia powder (product name "3YS20A," manufactured by TOSOH Corporation), a black zirconia powder (product name "TZ-Black," manufactured by TOSOH Corporation), and a zirconia powder (product name "3YSE," manufactured by TOSOH Corporation) were molded at a pressure of 50 MPa using a die press. Each of the obtained compacts was further molded at a pressure of 200 MPa using a cold isostatic press (CIP) to obtain a disk-shaped compact.
Zirconia powders (3YS40A and 3YS60A) were produced as follows. A high-purity alumina powder was added in an amount of 40 wt % or 60 wt % to a zirconia powder containing 3 mol % of yttria (product name "TZ-3YS," manufactured by TOSOH Corporation), and the mixture was subjected to ball mill mixing in an ethanol solvent using zirconia-made balls with a diameter of 10 mm and then dried to obtain a raw material powder. The obtained raw material powder was molded under the same conditions as above.
Each of the obtained compacts was sintered in air at a temperature rising rate of 100° C./h and a sintering temperature of 1,400 to 1,500° C. to obtain a sintered body of φ17 mm. The properties of the obtained sintered body are shown in TABLE 6 as a reference example. The opposite sides of the obtained sintered body were grounded and polished to a prescribed thickness to thereby obtain a zirconia sintered body thin plate. In TABLEs, Hv10 represents a Vickers hardness measured using an indenter load of 10 kgf.
The surface of the obtained zirconia sintered body thin plate and the surface of aluminosilicate-based chemically strengthened glass (32 mm×25 mm) were washed with acetone. Then these bonding surfaces were coated uniformly with an epoxy-based thermosetting resin (product number "XN1245SR," manufactured by Nagase ChemteX Corporation). With a load applied uniformly to the upper and lower surfaces of the composite plate, the zirconia sintered body and the chemically strengthened glass were bonded to each other under the condition of 140° C. for 30 minutes. The thicknesses of the layers of the obtained composite plate are shown in TABLE 1.

The results of evaluation are shown in TABLE 1. The apparent densities of all the composite plates were 4.3 g/cm$^3$ or less, and the Vickers hardnesses of all the composite plates were 1,000 or higher. The results of the shock resistance test were 10 cm or more for all the composite plates, and the composite plates were found to have high shock resistance.

Example 14

A composite plate was produced under the same conditions as in Example 1 except that a zirconia sintered body thin plate having dimensions of 32 mm×25 mm was obtained using the white zirconia powder (product name "3YS20A," manufactured by TOSOH Corporation). The result of the shock resistance test is shown in TABLE 1. Cracking of the composite plate occurred at 29 cm, and the composite plate was found to have high shock resistance.

Example 15

A composite plate was produced under the same conditions as in Example 1 except that the adhesive used was a two-part epoxy-based adhesive (product numbers "XNR3324" and "XNH3324," manufactured by Nagase ChemteX Corporation). The bonding was performed at 100° C. for 30 minutes. The result of the shock resistance test is shown in TABLE 1. The fracture height of the composite plate was 24 cm, and the composite plate was found to have high shock resistance.

Example 16

A 3YS20A composite plate of 32 mm×25 mm was produced by the same method as in Example 14. #100 sand paper was placed on the surface of the zirconia sintered body thin plate of the produced composite plate, and an iron-made weight of 3 kg was used to apply a load. The iron-made weight was moved a distance of 30 cm on the sand paper and reciprocated 5 times to flaw the composite plate. The result of the steel ball drop test on the composite plate subjected to flaw treatment is shown in TABLE 1. The steel ball fracture height was 30 cm, and no reduction in impact strength due to the flaw treatment was found.

Example 17

A 3YS20A composite plate of 32 mm×25 mm was produced by the same method as in Example 14. The bonding was performed under the condition of 140° C. for 30 minutes using a hot press such that a pressure of 4 MPa was applied to the plate. The thickness of the adhesive layer of the obtained composite plate was 7 μm. The steel ball fracture height was 47 cm, and the composite plate was found to have high shock resistance.

Examples 18 and 19

3YS20A composite plates of 32 mm×25 mm were produced by the same method as in Example 14. The relative dielectric constant and dielectric loss tangent of each of the composite plates at room temperature and 1 GHz are shown in TABLE 2. The relative dielectric constant and dielectric loss tangent of each composite plate were found to be comparable to those of aluminosilicate glass.

The relative dielectric constant of the aluminosilicate glass measured separately at room temperature and 1 GHz was 7.5, and its dielectric loss tangent was 0.0125. The dielectric constant of 3YS20A was 28.4, and its dielectric loss tangent was 0.003. The relative dielectric constant computed from these values under the assumption of a series model was 9.5 and agreed well with the measured values. It was found that the relative dielectric constant of a composite plate can be reproduced using the series model of the zirconia sintered body and the tempered glass.

Examples 20 and 21

3YS20A composite plates of 32 mm×25 mm were produced by the same method as in Example 14, and their biaxial bending strength was measured. The bending strength was found to be a high value of about 940 MPa. The bending elastic modulus was estimated from the load-displacement curve in the test and found to be about 80 GPa. Each of these composite plates was found to have an elastic modulus comparable to that of tempered glass (70 GPa).

Example 22

Using the same method as in Example 1, a composite plate in which the ratio of the thickness of the zirconia sintered body/the thickness of the tempered glass was 0.09 was produced using 3YS20A. The results are shown in TABLE 4. Although the composite plate exhibited high shock resistance, the Vickers hardness was 800, and the abrasion resistance was slightly low.

Example 23

700 g of TZ-3YS powder, 14 g of a commercial polycarboxylate macromolecular dispersant used as a dispersant, 3.5 g of commercial polyethylene glycol mono-para-iso-octylphenyl ester used as an antifoaming agent, 245 g of ethyl acetate used as a solvent, 245 g of n-butyl acetate used as a solvent, 49 g of butyral resin (degree of polymerization: about 1,000) powder used as a binder, and 42 g of industrial dioctyl phthalate used as a plasticizer were added to a ball mill and mixed for 48 hours. A green sheet was formed on PET used as a carrier film using a doctor blade device and a doctor blade.

The obtained green sheet was placed on a porous alumina setter and sintered with an alumina setter used as a weight placed on the green sheet. During the sintering, temperature was increased from room temperature to 450° C. at 5° C./h, and the green sheet was held at 450° C. for 10 hours to perform degreasing. Then the temperature was increased from 450° C. to 1,000° C. at 50° C./h, and the green sheet was held at 1,000° C. for 5 hours. Then the green sheet was held at 1,450° C. for two hours to perform sintering. The relative density of the obtained sintered body was 99% or higher.

The obtained sintered body was bonded to a 0.698 mm-thick chemically strengthened glass of 32 mm×25 mm using an epoxy-based thermosetting resin (product number "XN1245SR," manufactured by Nagase ChemteX Corporation) in the same manner as in Example 1. The surface of the zirconia sintered body thin plate of the bonded composite plate was ground and polished to produce a composite plate.

The thickness of the sintered body was 0.302 mm, and the thickness of the adhesive layer was 45 μm. The thickness of the zirconia sintered body/the thickness of the glass was 0.43. The apparent density of the composite plate was 3.55 g/cm³, and its Vickers hardness was 1,430. The shock resistance test using the steel ball dropped as in Example 1 was performed, and the fracture height of the composite plate was found to be 26 cm.

Comparative Example 1

Using the same method as in Example 1, a composite plate in which the ratio of the thickness of the zirconia sintered body/the thickness of the tempered glass was 1.66 was produced using 3YS20A. The results are shown in TABLE 4. The apparent density of the composite plate was higher than 4.3 g/cm³.

Comparative Example 2

The steel ball drop test was performed under the condition of no adhesive by the same method as in Example 1 using 3YS20A. The results are shown in TABLE 4. When the zirconia sintered body was placed directly on the glass with no adhesive, fracture occurred at about 3 cm, and it was found that the shock resistance characteristics were significantly low.

Comparative Examples 3 to 5

Flaw treatment was performed on the surfaces of aluminosilicate-based tempered glasses with different thicknesses (32 mm×25 mm, thickness: 0.55 mm, 0.7 mm, 1.1 mm) by the same method as in Example 15 to evaluate their shock resistance before and after the flaw treatment. The results are shown in TABLE 5. When the thickness was 0.55 mm, the base material was cracked by the flaw treatment. For the tempered glasses with thicknesses of 0.7 and 1.1 mm, the flaw treatment caused the steel ball fracture height to be reduced by about one half.

Comparative Examples 6 and 7

Using the same method as in Example 1, composite plates were produced using sapphire single crystals (manufactured by ORBE PIONEER Ltd.) (32 mm×25 mm) instead of the zirconia sintered body, and the steel ball drop test was performed under the same conditions. The results are shown in TABLE 7. The density of the sapphire was 3.99 g/cm³.

In the composite plates using sapphire, the steel ball fracture height was less than 10 cm, and the shock resistance characteristics were lower than those of the composite plate using the zirconia sintered body. This may be because, since the elastic modulus of sapphire is about twice that of the zirconia sintered body (the elastic modulus of sapphire is 400 GPa), tensile stress occurs on the sapphire side.

Examples 24 to 28

Using the same method as in Example 1, a composite plate of 32 mm×25 mm was produced using 3YS20A and using, as the base material, one of an aluminum (97 wt %)-magnesium alloy (#5052, manufactured by Eggs), a magnesium (90 wt %)-aluminum-zinc alloy (product name "AZ91D," manufactured by MG Precision Co., Ltd.), cloth Bakelite, and paper Bakelite (manufactured by Fuso Rubber Co., Ltd.).

A composite plate of 32 mm×25 mm was produced using 3YS20A and using rigid polyvinyl chloride (MISUMI Group Inc.) by the same method as in Example 1 except that cyanoacrylate was used as the adhesive.

The results of evaluation are shown in TABLE 8. The apparent densities of all the composite plates were 4.3 g/cm³ or less, and the Vickers hardnesses of all the composite plates were 1,000 or more. The results of the shock resistance test were 10 cm or more for all the composite plates, and the composite plates were found to have high shock resistance.

TABLE 1

| | MATERIAL | | | THICKNESS | | | | RATIO | APPARENT | VICKERS | STEEL BALL FRACTURE |
|---|---|---|---|---|---|---|---|---|---|---|---|
| | ZIRCONIA | GLASS | ADHESIVE | ZIRCONIA mm | GLASS mm | ADHESIVE mm | TOTAL mm | ZIRCONIA/ GLASS | DENSITY g/cm³ | HARDNESS Hv10 | HEIGHT cm |
| Example 1 | 3YS20A | TEMPERED GLASS | XN1245SR | 0.322 | 0.699 | 0.033 | 1.054 | 0.46 | 3.42 | 1430 | 32 |
| Example 2 | 3YS20A | TEMPERED GLASS | XN1245SR | 0.342 | 0.684 | 0.030 | 1.056 | 0.50 | 3.47 | 1430 | 30 |
| Example 3 | 3YS20A | TEMPERED GLASS | XN1245SR | 0.330 | 0.550 | 0.041 | 0.921 | 0.60 | 3.60 | 1430 | 26 |
| Example 4 | 3YS20A | TEMPERED GLASS | XN1245SR | 0.485 | 0.551 | 0.036 | 1.072 | 0.88 | 3.88 | 1430 | 20 |
| Example 5 | 3YS20A | TEMPERED GLASS | XN1245SR | 0.496 | 0.701 | 0.080 | 1.277 | 0.71 | 3.72 | 1430 | 25 |
| Example 6 | 3YS20A | TEMPERED GLASS | XN1245SR | 0.309 | 1.103 | 0.037 | 1.449 | 0.28 | 3.12 | 1430 | 30 |
| Example 7 | 3YS20A | TEMPERED GLASS | XN1245SR | 0.487 | 1.094 | 0.030 | 1.611 | 0.45 | 3.39 | 1430 | 25 |
| Example 8 | 3YS20A | TEMPERED GLASS | XN1245SR | 0.783 | 1.100 | 0.035 | 1.918 | 0.71 | 3.72 | 1430 | 20 |
| Example 9 | 3YS20A | TEMPERED GLASS | XN1245SR | 0.343 | 0.545 | 0.159 | 1.047 | 0.63 | 3.63 | 1430 | 12 |
| Example 10 | 3YS40A | TEMPERED GLASS | XN1245SR | 0.297 | 0.693 | 0.035 | 1.025 | 0.43 | 3.22 | 1480 | 21 |
| Example 11 | 3YS60A | TEMPERED GLASS | XN1245SR | 0.312 | 0.691 | 0.031 | 1.034 | 0.45 | 3.13 | 1530 | 25 |
| Example 12 | TZ-Black | TEMPERED GLASS | XN1245SR | 0.251 | 0.697 | 0.032 | 0.980 | 0.36 | 3.41 | 1240 | 29 |

TABLE 1-continued

| | MATERIAL | | | THICKNESS | | | | RATIO | APPARENT DENSITY g/cm³ | VICKERS HARDNESS Hv10 | STEEL BALL FRACTURE HEIGHT cm |
|---|---|---|---|---|---|---|---|---|---|---|---|
| | ZIR-CONIA | GLASS | ADHESIVE | ZIR-CONIA mm | GLASS mm | ADHE-SIVE mm | TOTAL mm | ZIR-CONIA/GLASS | | | |
| Example 13 | 3YSE | TEMPERED GLASS | XN1245SR | 0.276 | 0.696 | 0.024 | 0.996 | 0.40 | 3.48 | 1240 | 35 |
| Example 14 | 3YS20A | TEMPERED GLASS | XN1245SR | 0.311 | 0.692 | 0.048 | 1.051 | 0.45 | 3.40 | 1430 | 29 |
| Example 15 | 3YS20A | TEMPERED GLASS | XNR/H3324 | 0.285 | 0.701 | 0.024 | 1.010 | 0.41 | 3.33 | 1430 | 24 |
| Example 16 | 3YS20A | TEMPERED GLASS | XN1245SR | 0.285 | 0.693 | 0.047 | 1.025 | 0.41 | 3.34 | 1430 | 30 |
| Example 17 | 3YS20A | TEMPERED GLASS | XN1245SR | 0.315 | 1.103 | 0.007 | 1.425 | 0.29 | 3.13 | 1430 | 47 |

TABLE 2

| | MATERIAL | | | THICKNESS | | | | RATIO | DIELECTRIC CONSTANT ROOM TEMPERATURE, 1 GHz | DIELECTRIC LOSS TANGENT ROOM TEMPERATURE, 1 GHz |
|---|---|---|---|---|---|---|---|---|---|---|
| | ZIR-CONIA | GLASS | ADHESIVE | ZIR-CONIA mm | GLASS mm | ADHE-SIVE mm | TOTAL mm | ZIR-CONIA/GLASS | | |
| Example 18 | 3YS20A | TEMPERED GLASS | XN1245SR | 0.324 | 0.696 | 0.025 | 1.045 | 0.47 | 11.1 | 0.011 |
| Example 19 | 3YS20A | TEMPERED GLASS | XN1245SR | 0.190 | 0.549 | 0.028 | 0.767 | 0.35 | 10.1 | 0.012 |

TABLE 3

| | MATERIAL | | | THICKNESS | | | | RATIO | FRACTURE LOAD kgf | BENDING STRENGTH MPa | BENDING ELASTIC MODULUS GPa |
|---|---|---|---|---|---|---|---|---|---|---|---|
| | ZIR-CONIA | GLASS | ADHESIVE | ZIR-CONIA mm | GLASS mm | ADHE-SIVE mm | TOTAL mm | ZIR-CONIA/GLASS | | | |
| Example 20 | 3YS20A | TEMPERED GLASS | XN1245SR | 0.269 | 0.694 | 0.026 | 0.989 | 0.39 | 59.0 | 947 | 81 |
| Example 21 | 3YS20A | TEMPERED GLASS | XN1245SR | 0.203 | 0.692 | 0.036 | 0.931 | 0.29 | 52.9 | 940 | 84 |

TABLE 4

| | MATERIAL | | | THICKNESS | | | | RATIO | APPARENT DENSITY g/cm³ | VICKERS HARDNESS Hv10 | STEEL BALL FRACTURE HEIGHT cm |
|---|---|---|---|---|---|---|---|---|---|---|---|
| | ZIR-CONIA | GLASS | ADHESIVE | ZIR-CONIA mm | GLASS mm | ADHE-SIVE mm | TOTAL mm | ZIR-CONIA/GLASS | | | |
| Example 22 | 3YS20A | TEMPERED GLASS | XN1245SR | 0.098 | 1.103 | 0.040 | 1.241 | 0.09 | 2.70 | 800 | 25 |
| Comparative Example 1 | 3YS20A | TEMPERED GLASS | XN1245SR | 0.916 | 0.551 | 0.026 | 1.493 | 1.66 | 4.36 | 1430 | 18 |
| Comparative Example 2 | 3YS20A | TEMPERED GLASS | NONE | 0.296 | 0.702 | — | 0.998 | 0.42 | 3.36 | 1430 | 3 |

TABLE 5

| | THICKNESS OF TEMPERED GLASS mm | STEEL BALL FRACTURE HEIGHT VIRGIN cm | STEEL BALL FRACTURE HEIGHT FLAWED cm | REDUCTION RATIO |
|---|---|---|---|---|
| Comparative Example 3 | 0.55 | 42 | CRACKED DUE TO FLAWS | — |
| Comparative Example 4 | 0.7 | 31 | 18 | 42% |
| Comparative Example 5 | 1.1 | 50 | 25 | 50% |

TABLE 6

REFERENCE EXAMPLE

| | SINTERING TEMPERATURE | DENSITY g/cm$^3$ | RELATIVE DENSITY % | BENDING STRENGTH JISR1601 MPa | FRACTURE TOUGHNESS VALUE JISR1607 MPa m$^{0.5}$ | VICKERS HARDNESS JISR1610 Hv10 | RELATIVE DIELECTRIC CONSTANT ROOM TEMPERATURE, 1 GHz | DIELECTRIC LOSS TANGENT ROOM TEMPERATURE, 1 GHz |
|---|---|---|---|---|---|---|---|---|
| 3YS20A | 1500° C.-2 h | 5.473 | 99.3 | 1300 | 4.7 | 1430 | 28.4 | 0.0003 |
| 3YS40A | 1500° C.-2 h | 5.001 | 99.4 | 1340 | 4.7 | 1480 | 21.6 | 0.0014 |
| 3YS60A | 1500° C.-2 h | 4.588 | 99.1 | 1160 | 4.0 | 1530 | 16.7 | 0.0009 |
| 3YSE | 1450° C.-2 h | 6.073 | 99.8 | 1400 | 4.7 | 1240 | 36.6 | 0.0022 |
| TZ-Black | 1400° C.-1 h | 5.993 | 99.0 | 1199 | 5.1 | 1240 | 37.5 | 0.0053 |

TABLE 7

| | MATERIAL | | THICKNESS | | | | RATIO | | | STEEL BALL FRACTURE HEIGHT cm |
|---|---|---|---|---|---|---|---|---|---|---|
| | GLASS | ADHESIVE | SAPPHIRE mm | GLASS mm | ADHESIVE mm | TOTAL mm | SAPPHIRE/GLASS | APPARENT DENSITY g/cm$^3$ | VICKERS HARDNESS Hv10 | |
| Comparative Example 6 | SAPPHIRE | TEMPERED GLASS | XN1245SR | 0.346 | 0.700 | 0.024 | 1.070 | 0.49 | 2.45 | 1800 | 6 |
| Comparative Example 7 | SAPPHIRE | TEMPERED GLASS | XN1245SR | 0.837 | 1.100 | 0.030 | 1.967 | 0.76 | 2.96 | 1800 | 9 |

TABLE 8

| | MATERIAL FOR BASE MATERIAL | | | THICKNESS | | | | RATIO | APPARENT DENSITY g/cm$^3$ | VICKERS HARDNESS Hv | STEEL BALL FRACTURE HEIGHT cm |
|---|---|---|---|---|---|---|---|---|---|---|---|
| | BASE MATERIAL | ELASTIC MODULUS GPa | DENSITY g/cm$^3$ | ZIRCONIA mm | BASE MATERIAL mm | ADHESIVE LAYER mm | TOTAL mm | ZIRCONIA/BASE MATERIAL | | | |
| Example 24 | ALUMINUM ALLOY | 70 | 2.7 | 0.154 | 0.470 | 0.026 | 0.650 | 0.33 | 3.25 | 1430 | 20 |
| Example 25 | MAGNESIUM ALLOY | 45 | 1.81 | 0.204 | 0.527 | 0.022 | 0.753 | 0.39 | 2.75 | 1430 | 25 |
| Example 26 | CLOTH BAKELITE | 8 | 1.4 | 0.254 | 0.462 | 0.025 | 0.741 | 0.55 | 2.75 | 1430 | 15 |
| Example 27 | PAPER BAKELITE | 6.5 | 1.4 | 0.246 | 0.507 | 0.022 | 0.775 | 0.49 | 2.65 | 1430 | 15 |
| Example 28 | POLYVINYL CHLORIDE | 3.1 | 1.43 | 0.171 | 0.516 | 0.038 | 0.725 | 0.33 | 2.31 | 1430 | 10 |

INDUSTRIAL APPLICABILITY

The composite plate of the present invention including a zirconia sintered body sintered body and a base material formed from at least one selected from the group consisting of tempered glass, Bakelite, aluminum, and magnesium has shock resistance and abrasion resistance and can therefore be used preferably for small and thin components such as components of mobile electronic devices and watch components.

The invention claimed is:

1. A composite plate comprising a laminate including a zirconia sintered body, an adhesive layer, and a base material having an elastic modulus of 100 GPa or less, and the composite plate has a thickness of 2 mm or less, wherein
    the base material comprising tempered glass,
    the zirconia sintered body and the base material are bonded to each other through the adhesive layer,
    a ratio of thickness of the zirconia sintered body to a thickness of the base material (the thickness of the zirconia sintered body/the thickness of the base material) is 0.1 to 0.88 and wherein the composite plate has an apparent density of 4.3 g/cm$^3$ or less.

2. The composite plate according to claim 1, wherein the zirconia sintered body is zirconia containing 2-10 mol % of yttria.

3. The composite plate according to claim 1, wherein the zirconia sintered body is zirconia containing at least one selected from the group consisting of a white pigment, a transition metal oxide, and a coloring pigment.

4. The composite plate according to claim 1, wherein the zirconia sintered body has a relative density of 97% or higher.

5. The composite plate according to claim 1, wherein the zirconia sintered body has a Vickers hardness of 1,000 or more.

6. The composite plate according to claim 1, wherein the tempered glass is chemically strengthened aluminosilicate glass.

7. The composite plate according to claim 1, wherein the composite plate has a high shock resistance being a fracture height of 10 cm or more in a test in which a steel ball of 130 g is freely falled.

8. A casing of a mobile electronic device, comprising the composite plate according to claim 1.

9. A watch component comprising the composite plate according to claim 1.

10. A production method of the composite plate according to claim 1, the method comprising bonding the zirconia sintered body and the base material using an epoxy-based thermosetting adhesive at a temperature of 300° C. or lower.

11. A production method of the composite plate according to claim 2, the method comprising bonding the zirconia sintered body and the base material comprising tempered glass using an epoxy-based thermosetting adhesive at a temperature of 300° C. or lower.

12. The production method according to claim 10, wherein the zirconia sintered body is obtained by forming a green sheet having a thickness of 0.1 to 1 mm using a slurry prepared by mixing zirconia powder and an organic binder, and then sintering the green sheet at 1,300 to 1,500° C.

* * * * *